US011086808B2

(12) United States Patent
Isenegger et al.

(10) Patent No.: US 11,086,808 B2
(45) Date of Patent: Aug. 10, 2021

(54) DIRECT MEMORY ACCESS (DMA) COMMANDS FOR NONCONTIGUOUS SOURCE AND DESTINATION MEMORY ADDRESSES

(71) Applicant: Micron Technology, Inc., Boise, ID (US)

(72) Inventors: Laurent Isenegger, Morgan Hill, CA (US); Dhawal Bavishi, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/694,942

(22) Filed: Nov. 25, 2019

(65) Prior Publication Data

US 2021/0157753 A1   May 27, 2021

(51) Int. Cl.
*G06F 13/28* (2006.01)
*G06F 16/901* (2019.01)
*G06F 12/06* (2006.01)

(52) U.S. Cl.
CPC .......... *G06F 13/28* (2013.01); *G06F 12/0646* (2013.01); *G06F 16/9024* (2019.01); *G06F 2212/1008* (2013.01)

(58) Field of Classification Search
CPC ......... G11B 20/10; G06F 12/10; G06F 13/28; G06F 3/06; G06F 3/0601; G06F 13/14
See application file for complete search history.

(56) References Cited

U.S. PATENT DOCUMENTS

| | | | | | |
|---|---|---|---|---|---|
| 5,473,761 | A | * | 12/1995 | Parks | G06F 3/0601 710/26 |
| 2004/0064600 | A1 | * | 4/2004 | Lee | G06F 3/0659 710/22 |
| 2007/0189137 | A1 | * | 8/2007 | Saito | G11B 27/105 369/47.32 |
| 2012/0011340 | A1 | * | 1/2012 | Flynn | G06F 12/0292 711/171 |
| 2012/0144089 | A1 | * | 6/2012 | Hall | G06F 9/30018 711/3 |
| 2012/0151118 | A1 | * | 6/2012 | Flynn | G06F 11/1441 711/6 |
| 2013/0073821 | A1 | * | 3/2013 | Flynn | G11C 16/06 711/162 |
| 2014/0136811 | A1 | * | 5/2014 | Fleischer | G06F 13/28 711/207 |

* cited by examiner

*Primary Examiner* — Getente A Yimer
(74) *Attorney, Agent, or Firm* — Lowenstein Sandler LLP

(57) ABSTRACT

A processing device, operatively coupled with a plurality of memory devices, is configured to receive a DMA command for a plurality of data sectors to be moved from a source memory region to a destination memory region, the source memory region comprises a plurality of noncontiguous memory addresses and the DMA command comprises a source value referencing the plurality of noncontiguous memory addresses. The processing device further retrieves the plurality of noncontiguous memory addresses from a location identified by the source value. The processing device then reads the plurality of data sectors from the plurality of noncontiguous memory addresses. The processing device also writes the plurality of data sectors to the destination memory region.

20 Claims, 9 Drawing Sheets

DIRECT MEMORY ACCESS (DMA) COMMANDS FOR NONCONTIGUOUS SOURCE AND DESTINATION MEMORY ADDRESSES

TECHNICAL FIELD

The present disclosure generally relates to a memory system, and more specifically, relates to supporting direct memory access (DMA) commands for noncontiguous source and destination memory addresses.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
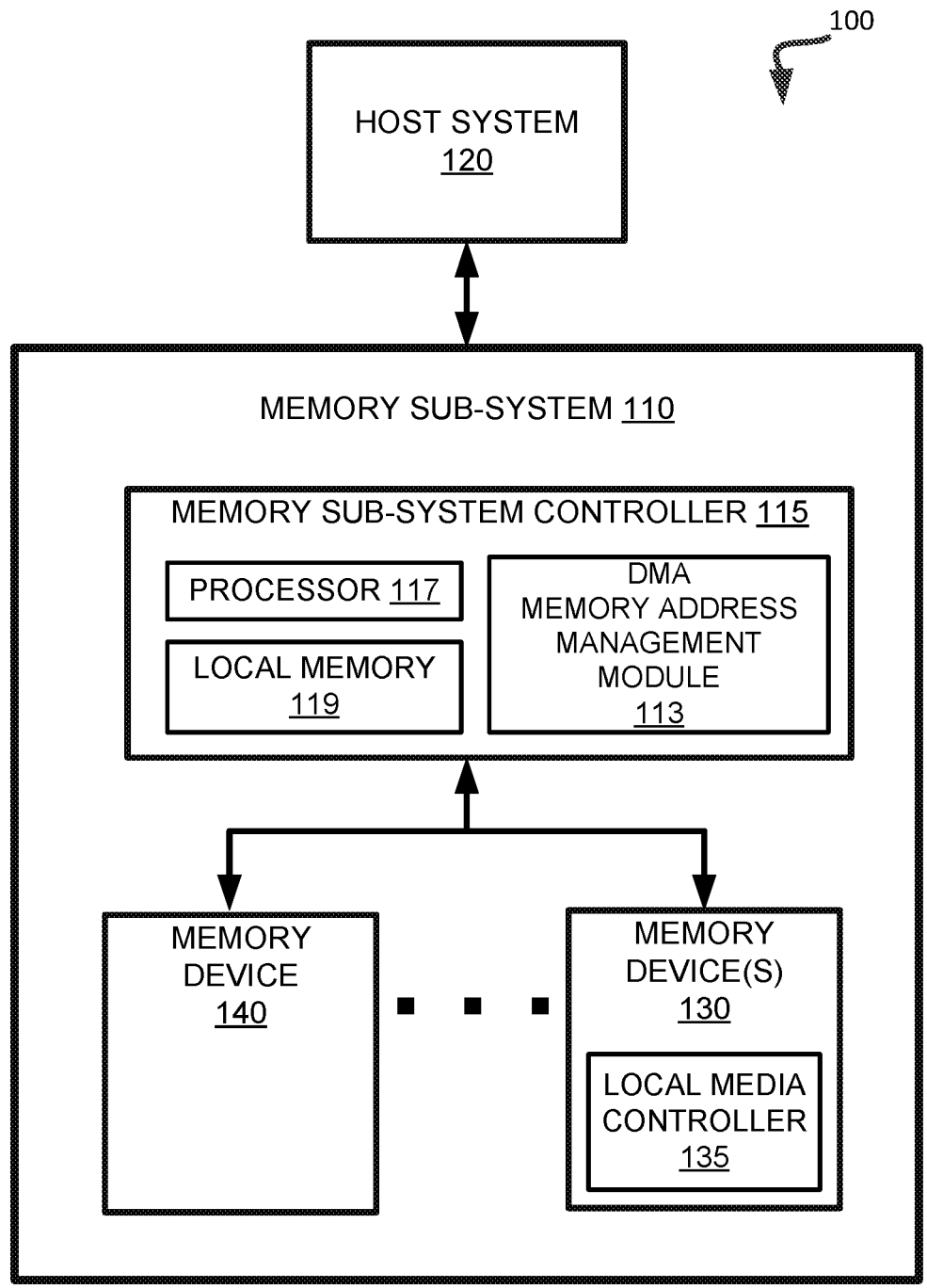
FIG. 1 illustrates an example computing environment for managing noncontiguous source and destination memory addresses in DMA commands in memory devices, in accordance with some embodiments of the present disclosure.

Aspects of the present disclosure are directed to supporting direct memory access (DMA) commands for noncontiguous source and destination memory addresses in memory devices of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

Conventional hardware-based DMA engines processes DMA commands by moving data from a source address space to a destination address space for the same or a different memory device within the memory sub-system. The DMA command includes a source address, a destination address, and a number of bytes to move from the source address to the destination address. Conventional DMA engines assume contiguity of the data being moved from the source to the destination. Therefore the DMA command specifies one memory address for the source and another memory address for the destination.

In certain memory operations, moving data from noncontiguous source memory addresses or into noncontiguous destination memory addresses can be desired. For example, moving data between the cache and main memory can require a single DMA command to move data out of order from a source memory region into a destination memory region. Similarly, moving data from main memory to cache can require a single DMA command to move data from a source memory region into disparate locations within a destination memory region. Given that a conventional DMA engine expects a single memory address for each of the source and destination fields, moving data from noncontiguous source memory addresses or into noncontiguous destination memory addresses cannot be performed using a single DMA command. As such, a conventional approach is to break down the request memory operation into several DMA commands, each moving data from a single memory address of a contiguous memory block into another single memory address of a contiguous memory block, introducing significant overhead in processing multiple read and write requests for the multiple DMA commands by the DMA engine leading to increased overall latency in the memory sub-system.

Aspects of the present disclosure address the above and other deficiencies by providing a memory sub-system allowing source and destination memory addresses in a DMA command to represent noncontiguous memory addresses by specifying a list of memory addresses for the source memory location, the destination memory location, or both the source and the destination memory locations. The list of memory addresses can be stored in the DMA command as a vector data type. A vector data type can refer to a data structure that can contain a variable size array of data elements. For example, a source memory location of a DMA command can be represented by a vector containing the sector-level source addresses as data elements within the vector. Similarly, a destination memory location of a DMA command can be represented by a vector containing the sector-level destination addresses as data elements within the vector. This can enable the DMA command initiator to specify noncontiguous memory addresses as the source or the destination fields of the DMA command, thus reading and/or writing data from noncontiguous memory addresses in a single DMA command.

In certain implementations, the source memory location can represent noncontiguous memory addresses while the destination memory location can represent a contiguous address space. In this case, the source memory location can be represented as a vector containing the list of memory addresses for the source memory location. In other implementations, the source memory location can represent a contiguous address space while the destination memory location can represent noncontiguous memory addresses. In this case, the destination memory location can be represented as a vector containing the list of memory addresses for the destination memory location. In yet another implementation, both the source memory location and the destination memory location can each represent a noncontiguous address space. In this case, the destination memory location can be represented by a vector containing the list of memory addresses for the destination memory location, and the source memory location here can be represented by a vector containing the list of memory addresses for the source memory location.

When a memory location is represented by a vector referencing noncontiguous memory addresses, the memory addresses can be stored internal in the DMA command or external to the DMA command. In one implementation, the memory addresses can be embedded in the DMA command. In this case, the DMA command initiator can write the actual memory addresses of the noncontiguous memory space in the vector within the DMA command. In other implementations, the memory addresses can be stored in DMA registers of the memory subsystem. In this case, the DMA command initiator can write the memory addresses into one or more DMA registers and then reference the DMA registers in the vector within the DMA command (e.g. by storing identifiers of the DMA registers in the memory address vector of the DMA command). The DMA engine can then read the memory addresses from the DMA registers in order to access the noncontiguous memory space. In yet another implementation, the memory addresses can be provided to the DMA engine as a linked list data structure. In this case, the DMA command initiator can store the head node (also called first node herein) of a linked list structure in the vector of the DMA command. The DMA engine can read the head node to retrieve the first memory address as well as the location of the next node in the linked list structure. The DMA engine can continue to read nodes of the linked list and retrieve memory addresses from each node until the last node of the linked list is reached.

Noncontiguous source and destination memory addresses in a DMA command techniques described herein allow a memory sub-system to handle a single DMA command to move a group of data sectors that are stored at noncontiguous source memory addresses into a destination location without having to break down the DMA command into several commands, each reading data sectors stored contiguously. The techniques further allows the memory sub-system to handle a single DMA command to move a group of data sectors into noncontiguous destination memory addresses without having to break down the DMA command into several commands, each writing data sectors into a contiguous destination memory location. Supporting DMA read and write from noncontiguous addresses enables an efficient use of the DMA engine processing time and resources as the overhead of executing multiple DMA commands to read or write data in noncontiguous memory addresses can be avoided. The performance of executing DMA commands can further be improved since multiple read and/or write operations from noncontiguous memory addresses can be performed as part of processing a single DMA command as opposed to multiple DMA commands, to read or write the same data. Supporting DMA commands for noncontiguous source and destination memory addresses can also introduce flexibility for the DMA command initiator because source and destination memory locations no longer need to be contiguous. The data sectors to be moved by a single DMA command no longer need to be stored contiguously in the source or the destination memory locations.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM). The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A 3D cross-point memory device is a cross-point array of non-volatile memory cells that can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased.

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks. Although non-volatile memory components such as NAND type flash memory is described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes DMA memory address management module 113 that can be used to support DMA commands for noncontiguous memory addresses for source and destination locations in the memory sub-system. In certain implementations, the noncontiguous memory addresses can be identified in the DMA command as a vector data type. A vector data type can refer to a data structure that can contain a variable sized array of data elements. For example, a source memory location of a DMA command can be represented by a vector containing the sector-level source addresses as data elements within the vector, such that a DMA engine can read data sectors from the vector and store them into a DMA buffer. Similarly, a destination memory location of a DMA command can be represented by a vector containing the sector-level destination addresses as data elements within the vector, such that a DMA engine can write data sectors from the DMA buffer into the vector.

In certain implementations, the source memory location can represent noncontiguous memory addresses while the destination memory location can represent a contiguous address space. In this case, the source memory location can be represented as a vector containing the list of memory addresses for the source memory location. The destination memory location can be represented by a single memory address where data sectors from the noncontiguous memory addresses can be written. In other implementations, the source memory location can represent a contiguous address space while the destination memory location can represent noncontiguous memory addresses. In this case, the destination memory location can be represented as a vector containing the list of memory addresses for the destination memory location. The source memory location here can be represented by a single memory address where data sectors can be read and later written to the noncontiguous memory addresses. In yet another implementation, both the source memory location and the destination memory location can each represent a noncontiguous address space. In this case, the destination memory location can be represented by a vector containing the list of memory addresses for the destination memory location, and the source memory location here can be represented by a vector containing the list of memory addresses for the source memory location. In this case, data sectors can be read from the noncontiguous source memory addresses and later written to the noncontiguous destination memory addresses.

A vector referencing noncontiguous memory addresses can store references to memory addresses either internal or external to the DMA command. In certain implementations, the DMA command can contain a value type field identifying the location of the noncontiguous memory addresses. In one implementation, the memory addresses can be embedded in the DMA command. In this case, the DMA command initiator can write the actual memory addresses of the noncontiguous memory space in the vector within the DMA command. In other implementations, the memory addresses can be stored in DMA registers of the memory subsystem. In this case, the DMA command initiator can write the memory addresses into DMA registers and then reference the DMA registers in the vector within the DMA command (e.g. by storing identifiers of the DMA registers in the memory address vector of the DMA command). The DMA engine can then access the DMA registers using the DMA registers identifiers stored in the memory address vector, and read the memory addresses from the DMA registers in order to access the noncontiguous memory space.

In yet another implementation, the noncontiguous memory addresses can be provided to the DMA engine as a linked list data structure. A Linked list data structure may refer to a linear data structure containing multiple elements, each element can be a separate object and can referred to as a node. Each node includes a data item as well as a reference to the next node of the linked list. The last node of the linked list can have has an empty reference. In this case, the DMA command initiator can store the first node of the linked list in the vector of the DMA command. The DMA engine can then read the first node to retrieve the first memory address as well as the location of the next node in the linked list structure. The DMA engine can continue to read nodes of the linked list and retrieve memory addresses from each node until the last node of the linked list is reached.

Figure 2A:
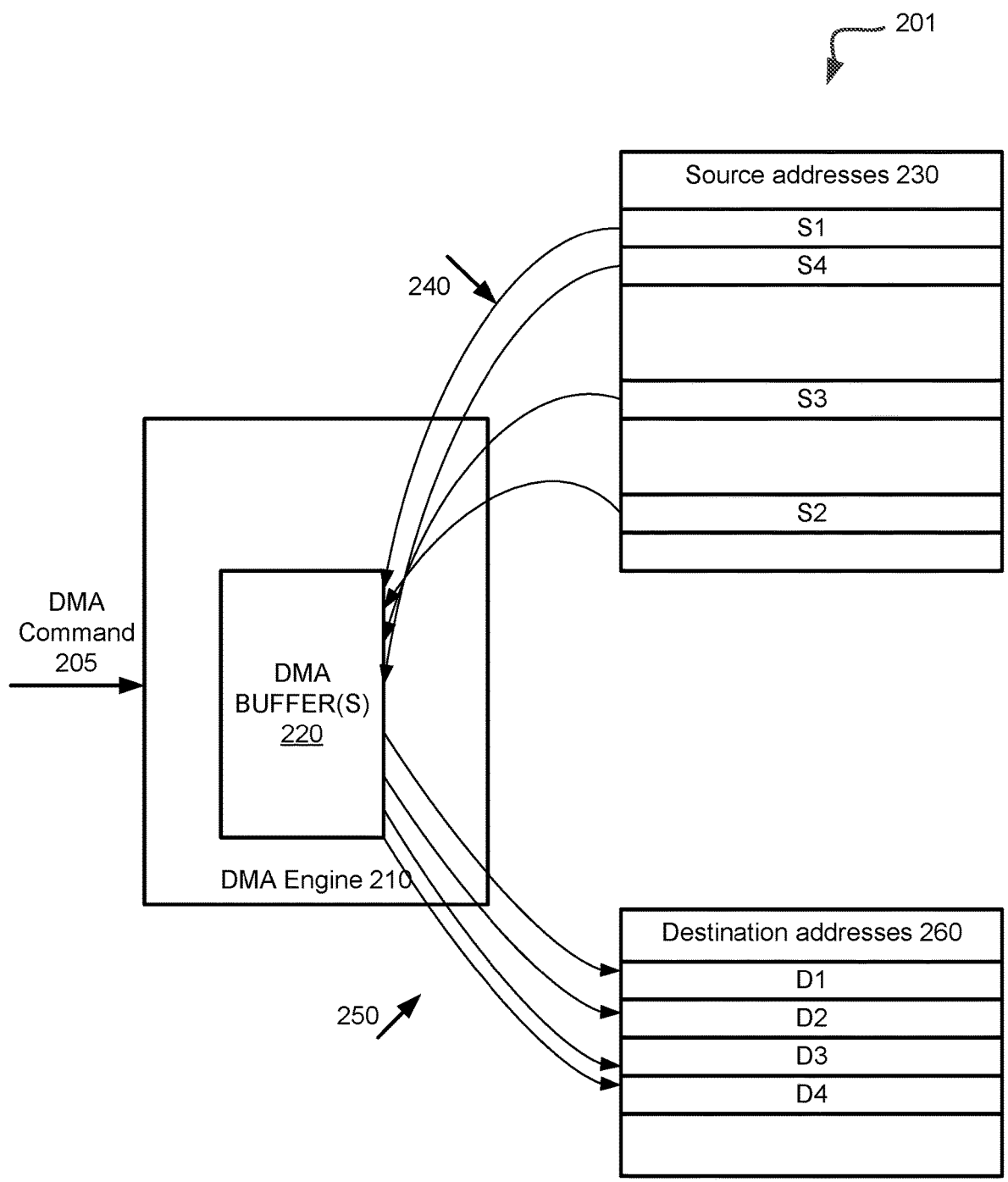
FIG. 2A illustrates an example of DMA command processing including noncontiguous source memory addresses, in accordance with some embodiments of the present disclosure.
Figure 2B:
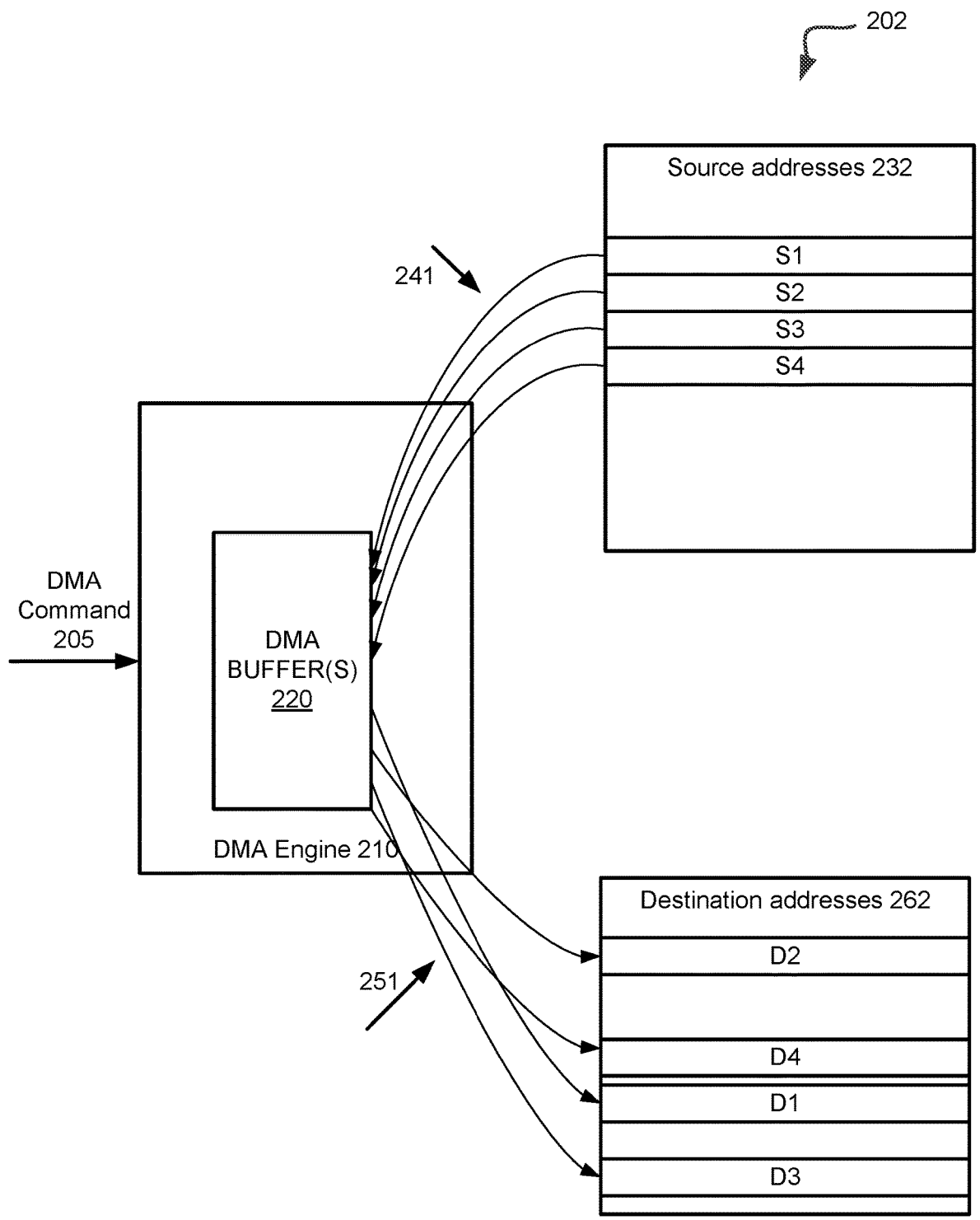
FIG. 2B illustrates an example of DMA command processing including noncontiguous destination memory addresses, in accordance with some embodiments of the present disclosure.
Figure 2C:
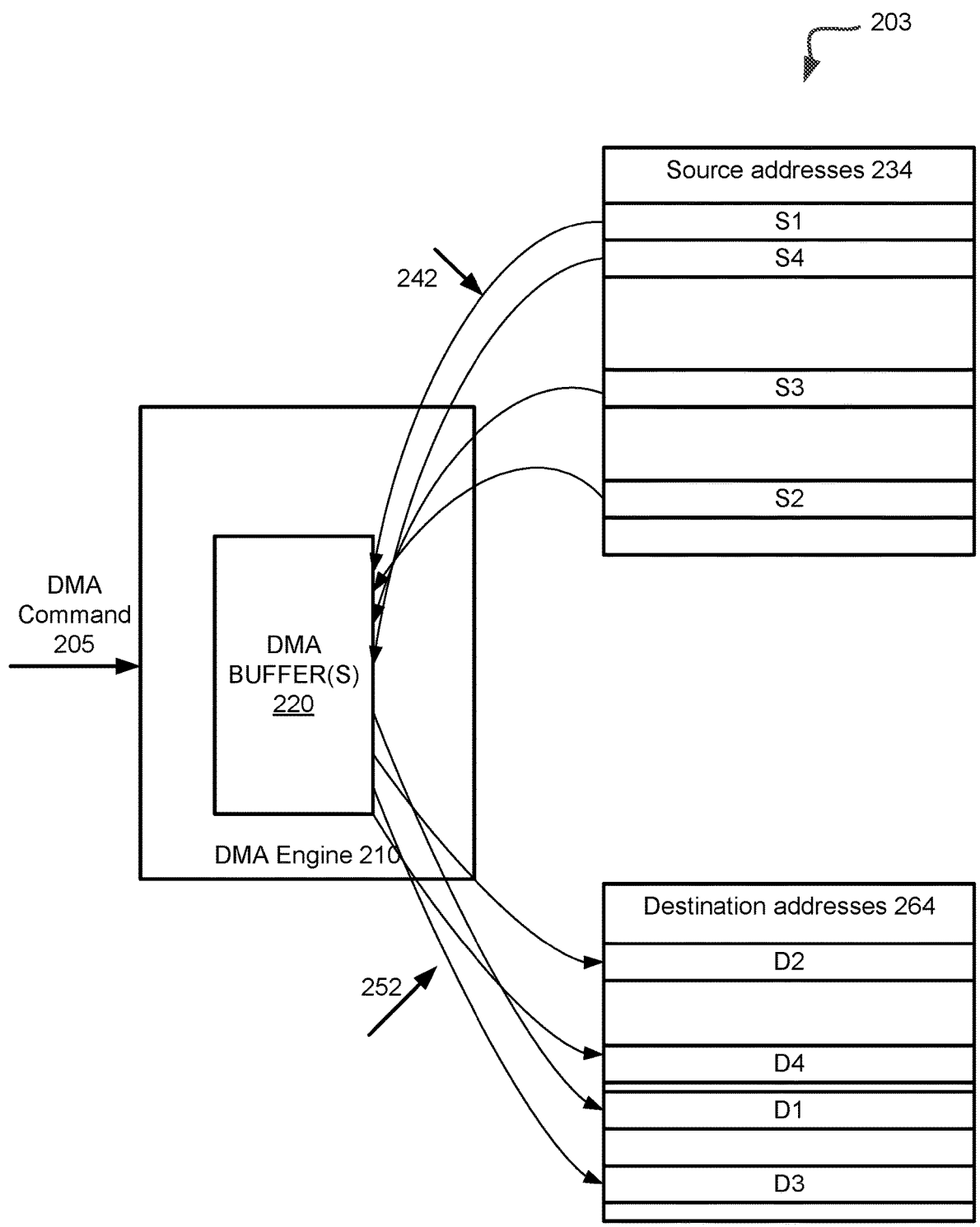
FIG. 2C illustrates an example of DMA command processing including noncontiguous source memory addresses and noncontiguous destination memory addresses, in accordance with some embodiments of the present disclosure.

FIGS. 2A-C are diagrams illustrating the processing of a DMA command to move data from a source memory location to a destination memory location in memory subsystem 110 for noncontiguous memory address management, in accordance with some embodiments of the present disclosure. FIG. 2A illustrates a first example 201 of a DMA command 205 comprising noncontiguous source memory addresses 230 and contiguous destination memory addresses 260. In this example, DMA engine 210 can receive DMA command 205 for moving data sectors S1-4 from noncontiguous source memory addresses 230 to destination contiguous memory addresses 260. A DMA command can include an indication of source addresses, an indication of destination addresses, and a number of sectors to transfer. In this case, DMA command 205 can include a source value identifying the list of noncontiguous memory addresses. Accordingly, sectors S1-4 can be noncontiguous sectors within the address space of the memory subsystem, representing the source memory location of DMA command 205. Sectors D1-4 can be contiguous sectors within the address space of the memory subsystem, representing the destination memory location of DMA command 205. A sector may refer to a known fixed size memory chunk that is can be referenced by a single memory address (e.g. 64 bytes).

At operation 240, DMA engine 210 can read a vector value from DMA command 205 referencing the noncontiguous source memory addresses 230. A vector data type can refer to data structure that can contain a variable size array of data elements. In this case, the vector value can include an array of memory addresses referencing S1-4. DMA engine 210 can then read the vector value referencing the source memory addresses, read sectors S1-4, and store sectors S1-4 into DMA buffers 220. In implementations, the vector value can include the explicit values of the source memory addresses. In other implementations, the vectors value can contain references to externally stored memory addresses (e.g. in DMA registers or in a linked list data structure), as explained in more details herein below.

In implementations, DMA engine 210 can perform data coalescing on sectors S1-4 read source addresses 230, based on the maximum access granularity of the source memory location and the maximum access granularity of the destination memory location. Coalescing includes holding data from a number of smaller read operations until one single larger write operation can be performed. Maximum access granularity can refer to the maximum number of bytes that can be accessed (read or write) in a single operation. For example, if a source memory media has a small access granularity (e.g. 64 byte) and a destination memory media has a larger access granularity (e.g. 128 bytes), coalescing can occur on the read request generation side. In this case, coalescing includes combining sectors from a number of read operations from the source memory address up to the maximum destination access granularity, to create a single write request to the destination memory location.

At operation 250, DMA engine 210 can write sectors from DMA buffers 220 to destination addresses 260 at D1-4. Given that destination addresses D1-4 are contiguous, destination value of DMA command 205 can reference a single memory address. In this case, memory address of sector D1 can be included in the destination value of DMA command 205. DMA engine 210 can then access the memory address of D1 to write data from DMA buffers 220 to destination sectors D1-4.

FIG. 2B illustrates a second example 202 of a DMA command 205 comprising contiguous source memory addresses 232 and noncontiguous destination memory addresses 262. In this example, DMA engine 210 can receive DMA command 205 for moving data sectors S1-4 from contiguous source memory addresses 232 to noncontiguous destination memory addresses 262. A DMA command can include an indication of source addresses, an indication of destination addresses, and a number of sectors to transfer. In this case, DMA command 205 can include a destination value identifying the list of noncontiguous destination memory addresses. Accordingly, sectors D1-4 can be noncontiguous sectors within the address space of the memory subsystem, representing the destination memory location of DMA command 205. Sectors S1-4 can be contiguous sectors within the address space of the memory subsystem, representing the source memory location of DMA command 205.

At operation 241, DMA engine 210 can read sectors S1-4 into DMA buffers 220. Given that source addresses S1-4 are contiguous, the source value of DMA command 205 can reference a single memory address. In this case, memory address of sector S1 can be included in the source value of DMA command 205. DMA engine 210 can then access the memory address of S1 to read data from source sectors S1-4 into DMA buffers 220.

In implementations, DMA engine 210 can perform data broadcasting on sectors S1-4 from source addresses 232, based on the maximum access granularity of the source memory location and the maximum access granularity of the destination memory location. Broadcasting includes breaking up the data from one larger read operation into a number of smaller write operations based on the access granularity of the destination media. For example, if a source memory media has a large access granularity (e.g. 128 byte) and a destination memory media has a small access granularity (e.g. 64 bytes), broadcasting can occur on the write request generation side. In this case, broadcasting includes breaking up sectors from a single read operation from the source memory address into the maximum destination access granularity, to create a number of write requests to the destination memory location.

At operation 251, DMA engine 210 can write sectors from DMA buffers 220 to destination addresses 260 at D1-4. Given that destination addresses D1-4 are noncontiguous, DMA engine 210 can read a vector value from DMA command 205 referencing the noncontiguous destination memory addresses 262. In this case, the vector value can include an array of memory addresses referencing D1-4. DMA engine 210 can then read the vector value referencing the destination memory addresses, write data from DMA buffer 220 into sectors D1-4 in the order specified by the vector value. In implementations, the vector value can include the explicit values of the destination memory addresses. In other implementations, the vectors value can contain references to externally stored memory addresses (e.g. in DMA registers or in a linked list data structure), as explained in more details herein below.

FIG. 2C illustrates a third example 203 of a DMA command 205 comprising noncontiguous source memory addresses 234 and noncontiguous destination memory addresses 264. In this example, DMA engine 210 can receive DMA command 205 for moving data sectors S1-4 from noncontiguous source memory addresses 234 to noncontiguous destination memory addresses 264. A DMA command can include an indication of source addresses, an indication of destination addresses, and a number of sectors to transfer. In this case, DMA command 205 can include a destination vector value identifying the list of noncontiguous destination memory addresses. Accordingly, sectors D1-4 can be noncontiguous sectors within the address space of the memory subsystem, representing the destination memory location of DMA command 205. In implementations, DMA command 205 can further include a destination value type field indicating whether or not the destination value is a vector data type (e.g. the destination value can be a vector data type when the destination memory location include noncontiguous memory addresses, whereas for contiguous destination memory addresses, the destination value can be a single memory address of the first sector of the destination memory location).

DMA command 205 can also include a source vector value identifying the list of noncontiguous source memory addresses. Thus, sectors S1-4 can be noncontiguous sectors within the address space of the memory subsystem, representing the source memory location of DMA command 205. In implementations, DMA command 205 can further include a source value type field indicating whether or not the source value is a vector data type (e.g. the source value can be a vector data type when the source memory location include noncontiguous memory addresses, whereas for contiguous source memory addresses, the source value can be a single memory address of the first sector of the source memory location).

At operation 242, DMA engine 210 can read a vector value from DMA command 205 referencing the noncontiguous source memory addresses 234. In this case, the vector value can include an array of memory addresses referencing S1-4. DMA engine 210 can then read the vector value referencing the source memory addresses, read sectors S1-4, and store sectors S1-4 into DMA buffers 220. In implementations, the vector value can include the explicit values of the source memory addresses. In other implementations, the vectors value can contain references to externally stored memory addresses (e.g. in DMA registers or in a linked list data structure), as explained in more details herein below.

At operation 252, DMA engine 210 can write sectors from DMA buffers 220 to destination addresses 264 at D1-4. Given that destination addresses D1-4 are noncontiguous, DMA engine 210 can read a vector value from DMA command 205 referencing the noncontiguous destination memory addresses 264. In this case, the vector value can include an array of memory addresses referencing D1-4. DMA engine 210 can then read the vector value referencing the destination memory addresses, write data from DMA buffer 220 into sectors D1-4 in the order specified by the vector value. In implementations, the vector value can include the explicit values of the destination memory addresses. In other implementations, the vectors value can contain references to externally stored memory addresses (e.g. in DMA registers or in a linked list data structure), as explained in more details herein below.

Figure 3:
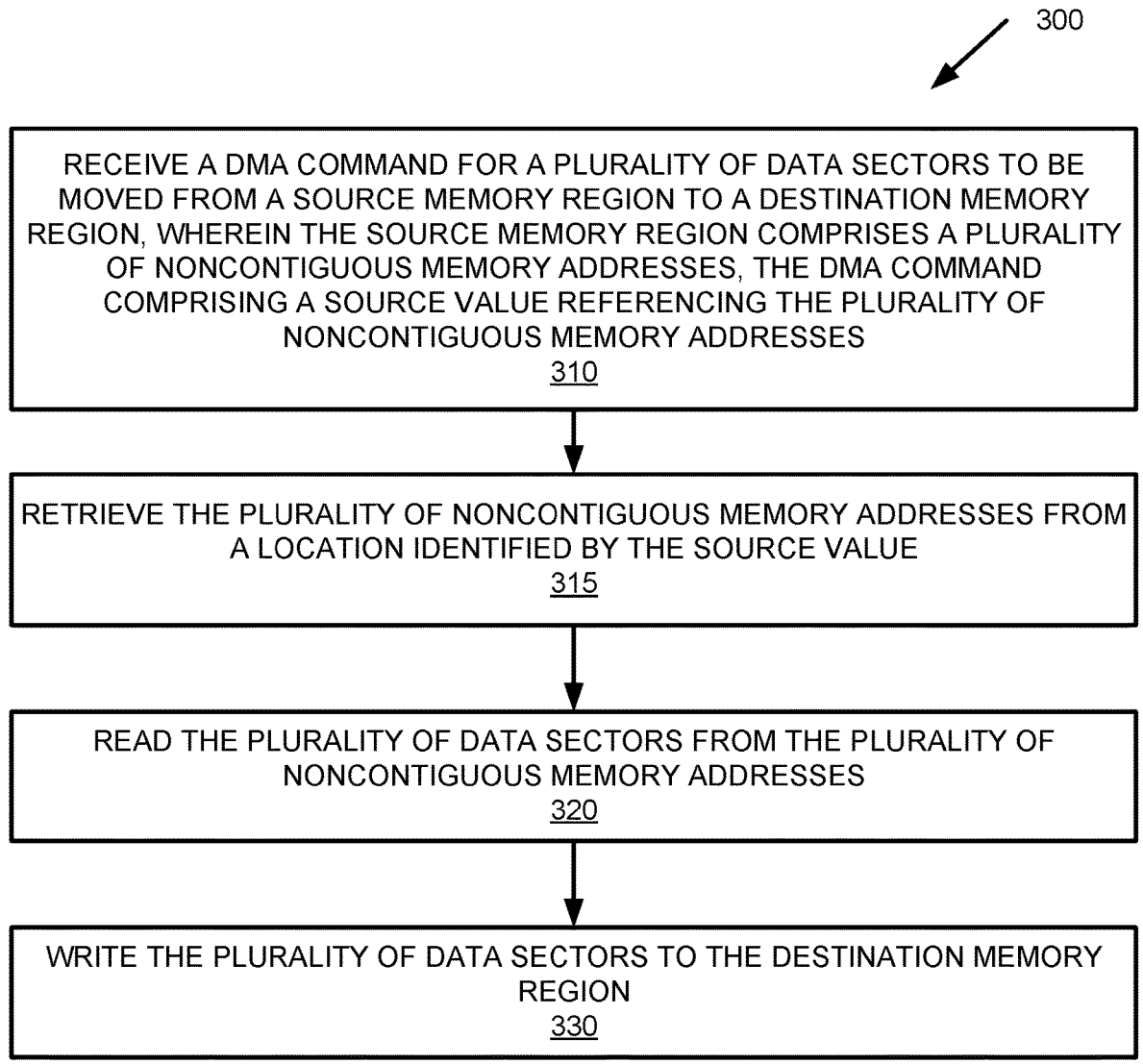
FIG. 3 is a flow diagram of an example method of managing noncontiguous source memory addresses in DMA commands in a memory sub-system, in accordance with some embodiments of the present disclosure.

FIG. 3 is a flow diagram of an example method of managing noncontiguous source memory addresses in DMA commands in a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by DMA memory address management module 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives a DMA command for a group of data sectors to be moved from a first memory region to a second memory region. In implementations, the first memory region can be a source memory region that includes a plurality of noncontiguous memory addresses, as explained in more details herein above. Further, the DMA command can include a source value referencing the plurality of noncontiguous memory addresses (e.g. as a vector value of the list of source memory addresses). The second memory region can be a destination memory region that includes a plurality of contiguous memory addresses where the data sectors can be written.

At operation 315, the processing logic retrieves the plurality of noncontiguous memory addresses from a location identified by the source value. In implementations, the noncontiguous source memory addresses can be stored internally within the DMA command. The source memory addresses can also be stored external to the DMA command. For example, the memory addresses can be stored in DMA registers referenced by the source value of the DMA command. In another example, the source memory addresses can be stored in a linked list data structure and the source value of the DMA command can reference the first node of the linked list, as explained in more details herein.

At operation 320, the processing logic can read the plurality of data sectors from the noncontiguous source memory addresses. In implementations, each source memory address can reference one data sector and the number of data sectors can be retrieved from the DMA command. The processing logic can then read the plurality of data sectors from the noncontiguous source memory addresses into DMA buffers of the memory subsystem.

At operation 330, the processing logic can write the plurality of data sectors to the destination memory region. In certain implementations, since the destination memory region represents contiguous memory addresses, the destination memory region can be referenced in the DMA command by the memory address of the first sector of the destination memory region. In implementations, the processing logic can retrieve the plurality of data sectors from DMA buffers of the memory subsystem and then write the data sectors into the contiguous destination memory region referenced in the DMA command.

Figure 4:
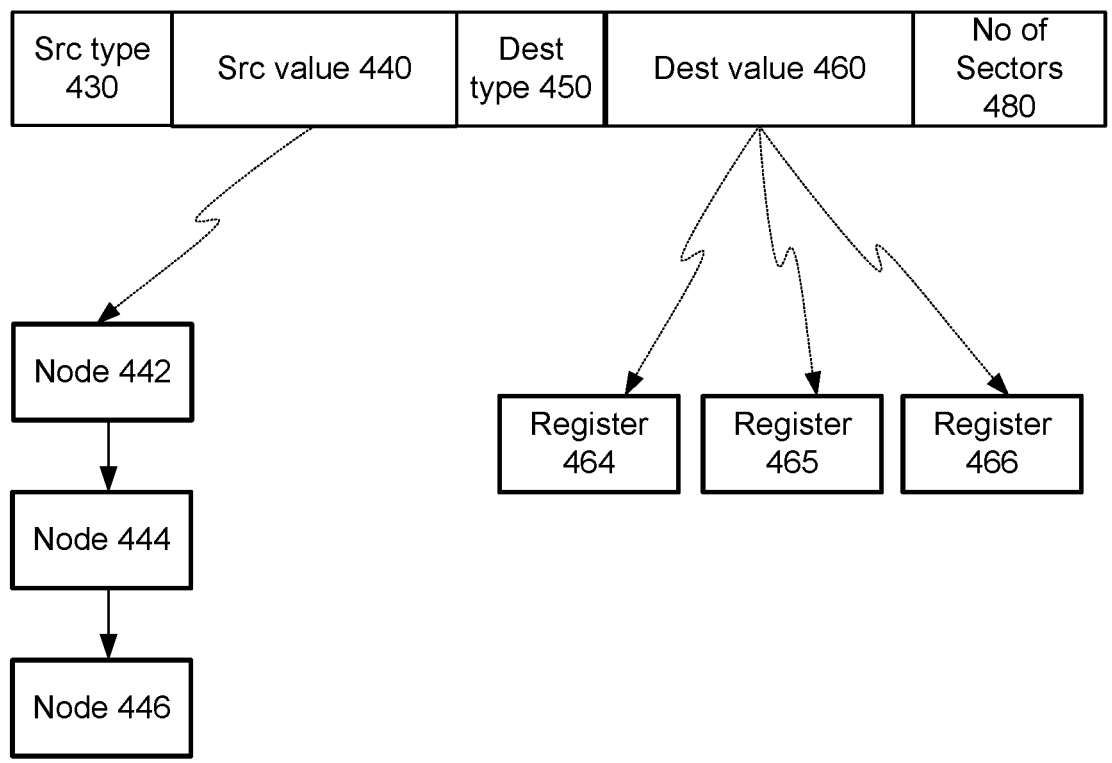
FIG. 4 is a block diagram illustrating an example of fields of a DMA command in a memory sub-system, in accordance with some embodiments of the present disclosure.

FIG. 4 is a block diagram illustrating an example of fields of a DMA command in a memory sub-system, in accordance with some embodiments of the present disclosure. DMA command 400 can contain data fields including source value type 430, source value 440, destination value type 450, destination value 460, and number of sectors 480. In implementations, DMA command can be sent to a DMA engine to move data sectors from a memory region identified by source value 440 to another memory region identified by destination value 460. Number of sectors field 480 can indicate the number of data sectors to be moved as a result of the DMA command.

In implementations, source value type 430 can identify whether the source value represents contiguous memory addresses or noncontiguous memory addresses. Source value type 430 can identify the location of the noncontiguous source memory addresses. In an example, source value type can have a value of 0, 1, 2, or 3. A value of 0 can indicate that the source value references contiguous memory addresses. A value of 1 can indicate that the source value references noncontiguous memory addresses that are stored internally in the DMA command. In this case, source value 440 can include the actual list of the noncontiguous memory addresses. A value of 2 can indicate that the source value references noncontiguous memory addresses that are stored in DMA registers. In this case, source value 440 can include identifiers of the DMA registers. In implementations, the order of the DMA registers identifiers can be the order of ready the memory addresses from memory. A value of 3 can indicate that the source value references noncontiguous memory addresses that are stored in a linked list data structure. In this case, source value 440 can include the first node of the linked list, which can reference the next node of the linked list. In implementations, the order of the nodes in the linked list can indicate the order of the noncontiguous source memory addresses from which the data sectors can be read and then written to the noncontiguous destination memory addresses.

In one implementation, source value type 430 can have a value of 3, indicating a linked list source value type. Source value 440 can then reference node 442, as the first node of the linked list. DMA memory address management module 113 can then access node 442 to read the first source memory address. DMA memory address management module 113 can also read a reference to node 444 from node 442. Similarly, DMA memory address management module 113 can read the next source memory address from node 444, along with a reference to node 446. Finally, DMA memory address management module 113 can read the last source memory address from node 446. DMA memory address management module 113 can detect that node 446 is the last node of the linked list because a reference to the next node in node 446 can be null.

Similar to source value type 430, destination value type 450 can identify whether the destination value 460 represents contiguous memory addresses or noncontiguous memory addresses and can also identify the location of the noncontiguous destination memory addresses. In an example, destination value type can have a value of 0 indicating contiguous destination memory addresses, 1 indicating destination memory addresses are embedded in DMA command 400, 2 indicating destination memory addresses stored in DMA registers, or 3 indicating destination memory addresses stored in. a linked list.

In the current implementation, destination value type 450 can have a value of 2, indicating that destination memory addresses are stored in DMA registers. Destination value 460 can then include identifiers of the DMA registers 464-466. In implementations, a write state machine within the DMA engine can step through DMA command 400 and can retrieve the DMA register identifies. The write state machine can then read the list of destination memory addresses from DMA registers 464-466. State machine can refer to a hardware component of the memory subsystem that is responsible for processing read or write requests including retrieval of source and destination memory addresses. In implementations, the order of DMA registers identifiers in the destination value 460 can indicate the order of the noncontiguous destination memory addresses that can receive the data sectors read from the noncontiguous source memory addresses.

Figure 5:
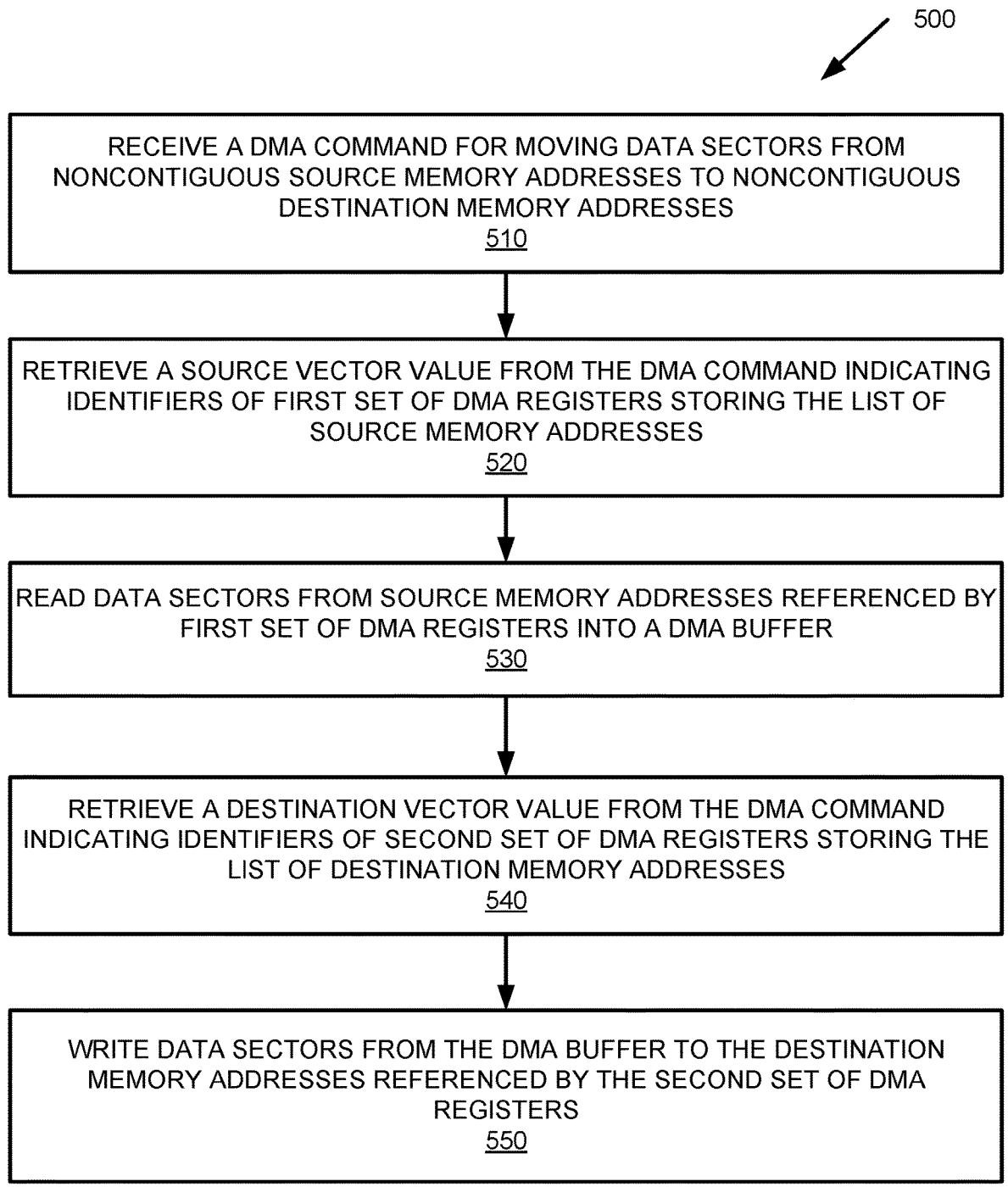
FIG. 5 is a flow diagram of an example method of managing noncontiguous source and destination memory addresses of DMA commands using DMA registers, in accordance with some embodiments of the present disclosure.

FIG. 5 is a flow diagram of an example method of managing noncontiguous source and destination memory addresses of DMA commands using DMA registers, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by DMA memory address management module 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic receives a DMA command for moving data sectors from noncontiguous source memory addresses to noncontiguous destination memory addresses. In implementations, the DMA command can include a source value referencing the noncontiguous source memory addresses (e.g. as a vector value of the list of source memory addresses). Similarly, the DMA command can include a destination value referencing the noncontiguous destination memory addresses (e.g. as a vector value of the list of destination memory addresses).

At operation 520, the processing logic retrieves the source vector value from the DMA command. In certain implementations, the DMA command can contain a source value type field identifying the location of the noncontiguous source memory addresses. In an example, the source value type can indicate that the source memory addresses are embedded in the DMA command. In another example, the source value type can indicate that the source memory addresses are stored in DMA registers within the DMA engine. In this case, the source value can include identifiers of the DMA registers. Moreover, in another example the source value type can indicate that the noncontiguous source memory addresses can be provided to the DMA engine as a linked list data structure. In this case, the source value can include the first node of the linked list, which points to the next node of the linked list, as explained in more details herein.

In this case, the source value includes identifiers of a first set of DMA registers storing the list of source memory addresses. The processing logic can then access the first set of DMA registers using the identifiers from the source value and can read the list of source memory addresses from the first set of DMA registers.

At operation 530, the processing logic can then read data sectors from the source memory addresses into the DMA buffer. In implementations, the number of data sectors to read from the source memory addresses can be retrieved from the DMA command, as explained in more details herein.

At operation 540, the processing logic retrieves the destination vector value from the DMA command. In certain implementations, the DMA command can contain a destination value type field identifying the location of the noncontiguous destination memory addresses. The destination value type can indicate that the destination memory addresses are embedded in the DMA command, are stored in DMA registers, or are stored in a linked list data structure, as explained in more details herein. In this case, the destination value type indicates that the destination memory addresses are stored in DMA registers, thus the destination value includes identifiers of a second set of DMA registers storing the list of memory addresses. The processing logic can then access the second set of DMA registers using the identifiers from the destination value and can read the list of destination memory addresses from the second set of DMA registers.

At operation 550, the processing logic write data sectors from the DMA buffer to the noncontiguous destination memory addresses referenced by the second set of DMA registers. In implementations, the order of writing the data sectors from the DMA buffer into the destination memory addresses can be determined based on the order of the DMA registers identifiers of the destination vector value.

Figure 6:
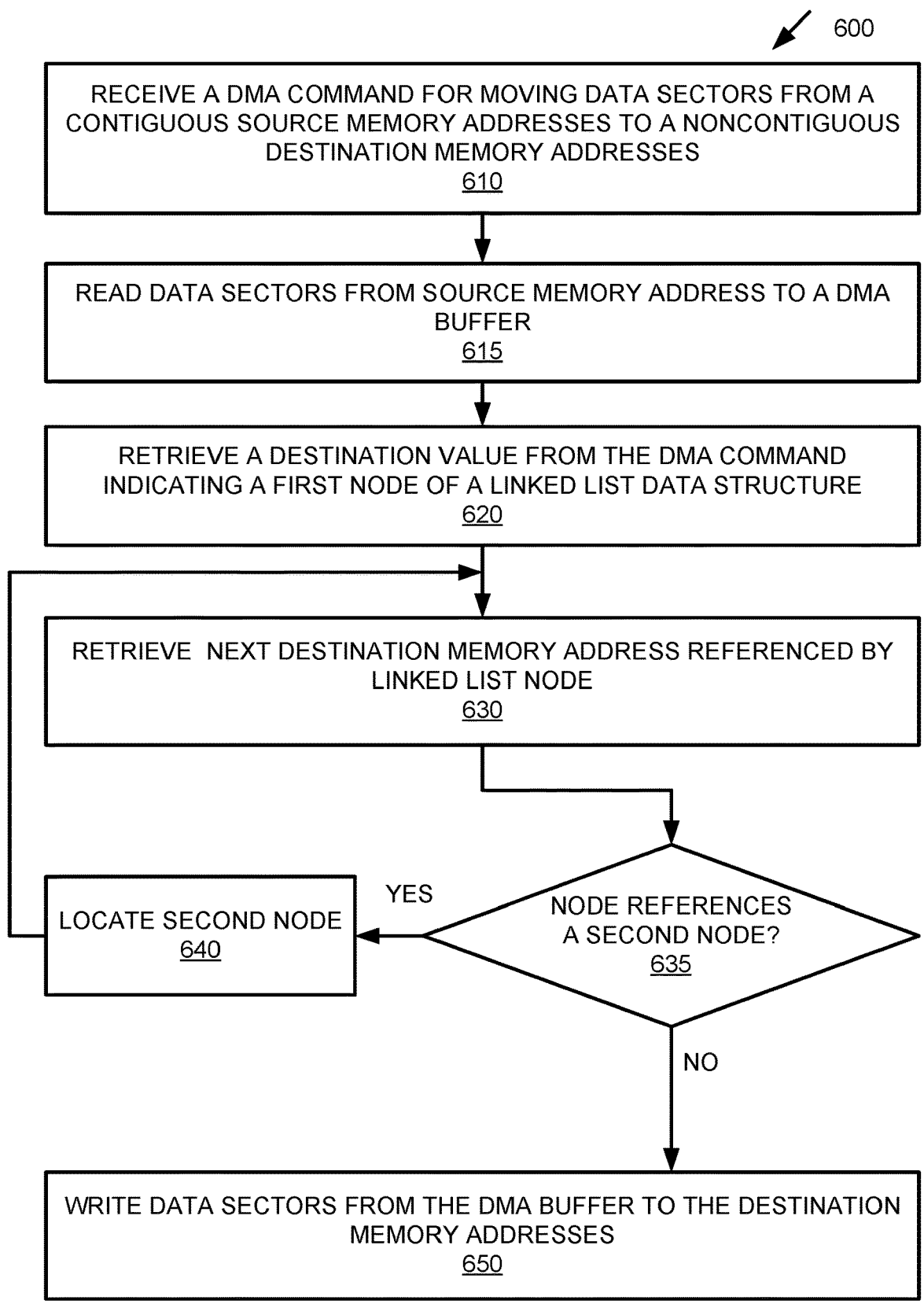
FIG. 6 is a flow diagram of an example method of managing noncontiguous destination memory addresses of DMA commands using a linked list, in accordance with some embodiments of the present disclosure.

FIG. 6 is a flow diagram of an example method of managing noncontiguous destination memory addresses of DMA commands using a linked list, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by DMA memory address management module 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic receives a DMA command for moving data sectors from contiguous source memory addresses to noncontiguous destination memory addresses. In implementations, the DMA command can include a destination value referencing the noncontiguous destination memory addresses (e.g. as a vector value of the list of destination memory addresses), as explained in more details herein above.

At operation 615, the processing logic reads the data sectors from the contiguous source memory address into a DMA buffer. In implementations, the DMA command can include a field indicating the number of data sectors to read form the source memory address, as explained in more details herein.

At operation 620, the processing logic retrieves the destination vector value from the DMA command. In this case, the noncontiguous destination memory addresses are stored in a linked list data structure. Thus the destination vector value can include the first node of the linked list. In implementations, the first node can include the first memory address of the vector of destination memory addresses, along with a reference to the next node of the linked list. In implementations, the reference to the next node can be a pointer to a memory location containing the second node of the linked list.

At operation 630, the processing logic can retrieve the next destination memory address from the current linked list node. In implementations, the processing logic can continue to retrieve destination memory addresses until the full linked list is processed. The processing logic can then write the data sectors from the DMA buffer to the list of noncontiguous memory addresses.

At operation 635, the processing logic can determine whether the last node of the linked list has been processed. In a linked list data structure, each node of the linked list references the next node of the linked list. The last node can contain a null reference, indicating that there are no mode nodes to process. Here, when the processing logic determines that the current node references a next node, the processing logic locates the next node at operation 640. For example, the current node can contain a pointer to a memory address containing the next node of the linked list. The processing logic then can loop back to operation 630 to read the following destination memory address from the next node.

At operation 650, when the processing logic determines that the current node does not reference a next node, the processing logic can decide to write the data sectors from the DMA buffer to the destination memory addresses retrieved from the linked list.

Figure 7:
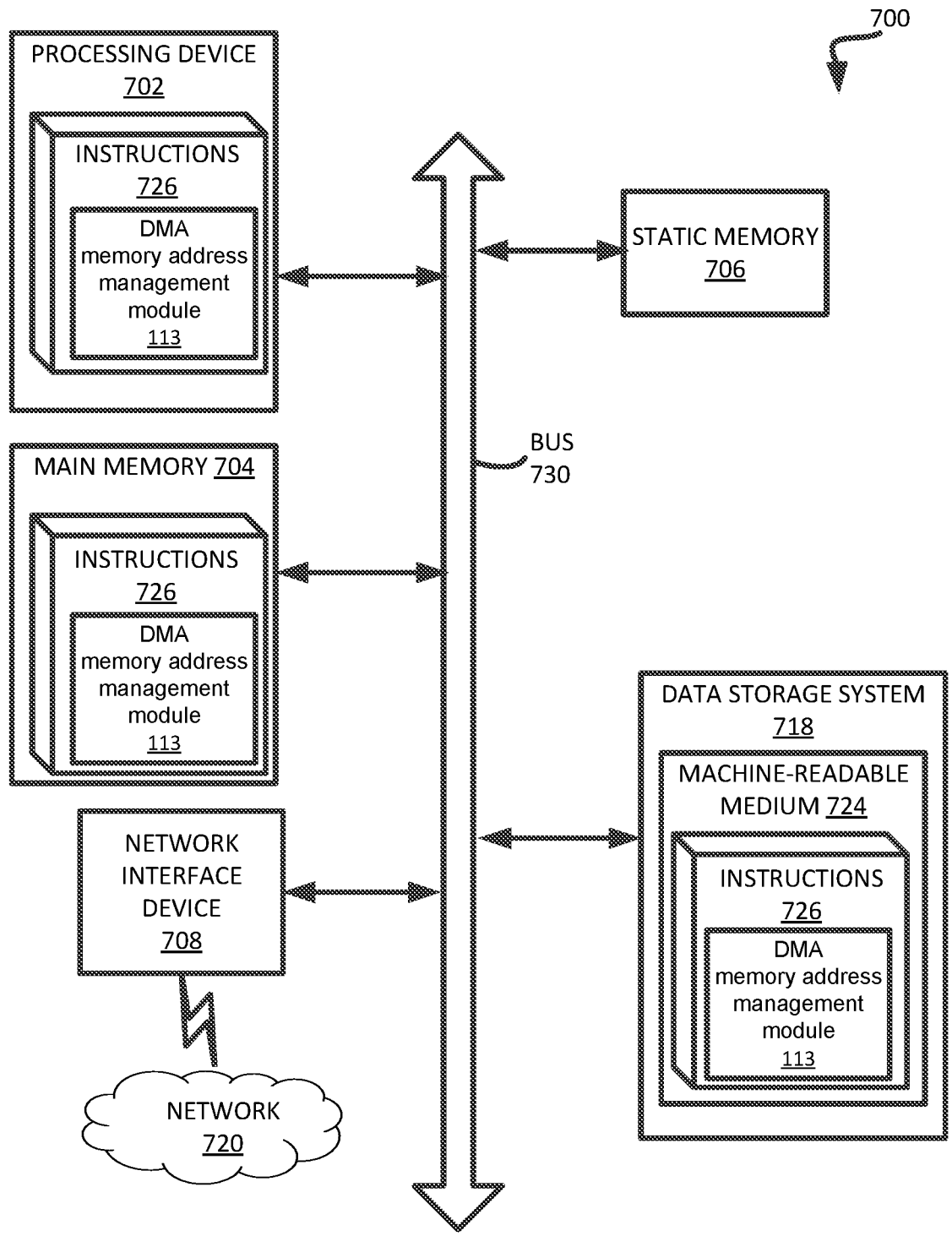
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to DMA memory address management module 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to DMA memory address management module 113 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a plurality of memory devices;
    a processing device, operatively coupled with the plurality of memory devices, to:
        receive a direct memory access (DMA) command for a plurality of data sectors to be moved from a source memory region to a destination memory region, wherein the source memory region comprises a plurality of noncontiguous memory addresses, the DMA command comprising a source value referencing the plurality of noncontiguous memory addresses;
        retrieve the plurality of noncontiguous memory addresses from a location identified by the source value;
        for each respective data sector of the plurality of data sectors associated with the DMA command, perform a read operation to read the respective data sector from a corresponding respective noncontiguous memory address from the plurality of noncontiguous memory addresses into a DMA buffer;
        retrieve the plurality of data sectors from the DMA buffer for writing into the destination memory region; and
        write the retrieved plurality of data sectors to the destination memory region.

2. The system of claim 1, wherein the plurality of noncontiguous memory addresses are referenced by a linked list data structure and wherein the source value comprises a first node of the linked list data structure.

3. The system of claim 1, wherein the plurality of noncontiguous memory addresses are stored in a plurality of registers, and wherein the source value comprises a plurality of identifiers referencing the plurality of registers.

4. The system of claim 1, wherein the source value comprises the plurality of noncontiguous memory addresses.

5. The system of claim 1, wherein the DMA command further comprises a source value type, the source value type identifying a location of the plurality of noncontiguous memory addresses.

6. The system of claim 1, wherein the destination memory region comprises a number of contiguous memory addresses.

7. The system of claim 1, wherein to read the respective data sector from a corresponding respective noncontiguous memory address into the DMA buffer, the processing device is further to store the plurality of data sectors, in a same order provided by the source value, into the DMA buffer.

8. The system of claim 7, wherein to write the plurality of data sectors to the destination memory region, the processing device is further to retrieve the plurality of data sectors, in the same order provided by the source value, from the DMA buffer.

9. A method comprising:
    receiving a DMA command for a plurality of data sectors to be moved from a source memory region to a destination memory region, wherein the destination memory region comprises a plurality of noncontiguous memory addresses, the DMA command comprising a destination value referencing the plurality of noncontiguous memory addresses;
    retrieving the plurality of noncontiguous memory addresses from a location identified by the destination value;
    reading the plurality of data sectors associated with the DMA command from the source memory region into a DMA buffer;
    retrieving the plurality of data sectors from the DMA buffer for writing into the plurality of noncontiguous memory addresses; and
    writing the retrieved plurality of data sectors to the plurality of noncontiguous memory addresses.

10. The method of claim 9, wherein the plurality of noncontiguous memory addresses are referenced by a linked list data structure and wherein the destination value comprises a first node of the linked list data structure.

11. The method of claim 9, wherein the plurality of noncontiguous memory addresses are stored in a plurality of registers, and wherein the destination value comprises a plurality of identifiers referencing the plurality of registers.

12. The method of claim 9, wherein the destination value comprises the plurality of noncontiguous memory addresses.

13. The method of claim 9, wherein the DMA command further comprises a destination value type, the destination value type identifying a location of the plurality of noncontiguous memory addresses.

14. The method of claim 9, wherein the source memory region comprises a number of contiguous memory addresses.

15. The method of claim 9, wherein reading the plurality of data sectors further comprises storing the plurality of data sectors into a DMA buffer, wherein the DMA command comprises a number of data sectors of the plurality of data sectors to be stored into the DMA buffer.

16. The method of claim 15, wherein writing the plurality of data sectors to the plurality of noncontiguous memory addresses further comprises retrieving the plurality of data sectors, in a same order provided by the destination value, from the DMA buffer.

17. A non-transitory computer-readable storage medium comprising instructions that, when executed by a processing device, cause the processing device to:

receive a DMA command for a plurality of data sectors to be moved from a source memory region to a destination memory region, wherein the source memory region comprises a first plurality of noncontiguous memory addresses and the destination memory region comprises a second plurality of noncontiguous memory addresses, the DMA command comprising a source value referencing the first plurality of noncontiguous memory addresses and a destination value referencing the second plurality of noncontiguous memory addresses;

retrieve the first plurality of noncontiguous memory addresses from a location identified by the source value;

retrieve the second plurality of noncontiguous memory addresses from a location identified by the destination value;

for each respective data sector of the plurality of data sectors associated with the DMA command, perform a read operation to read the respective data sector from a corresponding noncontiguous memory address from the first plurality of noncontiguous memory addresses into a DMA buffer;

retrieve the plurality of data sectors from the DMA buffer for writing into the second plurality of noncontiguous memory addresses; and write the retrieved plurality of data sectors to the second plurality of noncontiguous memory addresses.

18. The non-transitory computer-readable storage medium of claim 17, wherein the DMA command further comprises a source value type and a destination value type, the source value type identifying a location of the first plurality of noncontiguous memory addresses and the destination value type identifying a location of the second plurality of noncontiguous memory addresses.

19. The non-transitory computer-readable storage medium of claim 17, wherein to read the respective data sector from a corresponding respective noncontiguous memory address into the DMA buffer, the processing device is further to store the plurality of data sectors, in a same order provided by the source value, into the DMA buffer.

20. The non-transitory computer-readable storage medium of claim 19, wherein to write the plurality of data sectors to the second plurality of noncontiguous memory addresses, the processing device is further to retrieve the plurality of data sectors, in the same order provided by the source value, from the DMA buffer.

* * * * *